United States Patent [19]

Tacchi

[11] 4,110,986

[45] Sep. 5, 1978

[54] SYSTEMS FOR MAKING USE OF THE ENERGY CARRIED BY A FLUID AND SUPPLIED THERETO BY SOLAR ENERGY

[76] Inventor: Victorio Tacchi, Rioja 50, 1°Piso Dpto. 1, Cordoba, Argentina

[21] Appl. No.: 708,071

[22] Filed: Jul. 23, 1976

[30] Foreign Application Priority Data

Jul. 24, 1975 [AR] Argentina .............. 259738

[51] Int. Cl.² .............................................. F03G 7/02
[52] U.S. Cl. ..................... 60/641; 126/270; 126/271; 417/379
[58] Field of Search ............ 60/398, 641; 62/2; 126/270, 271; 137/469; 417/379; 237/1 A

[56] References Cited

U.S. PATENT DOCUMENTS 4,061,131  12/1977  Bohanon .................. 126/271

*Primary Examiner*—Allen M. Ostrager
*Assistant Examiner*—Stephen F. Husar
*Attorney, Agent, or Firm*—Fleit & Jacobson

[57] ABSTRACT

A system for making use of the thermal energy carried by a fluid and which is supplied to the fluid by a solar energy detector which converts the solar energy into heat.

The system basically comprises a solar energy detector which heats the fluid and valves, operated by the intrinsic energy of the fluid, for enabling the fluid to discontinuously flow through the detector only in a single direction. In one embodiment the system is used to pump hot air into a space to be heated. In other embodiments pressure accumulating chambers are also provided to accumulate the energy of the fluid which is intermittently supplied to a heat exchanger. The pressure accumulating chamber in another embodiment is an arrangement for producing work, such as a water pump or the compressor of a refrigerating system.

13 Claims, 3 Drawing Figures

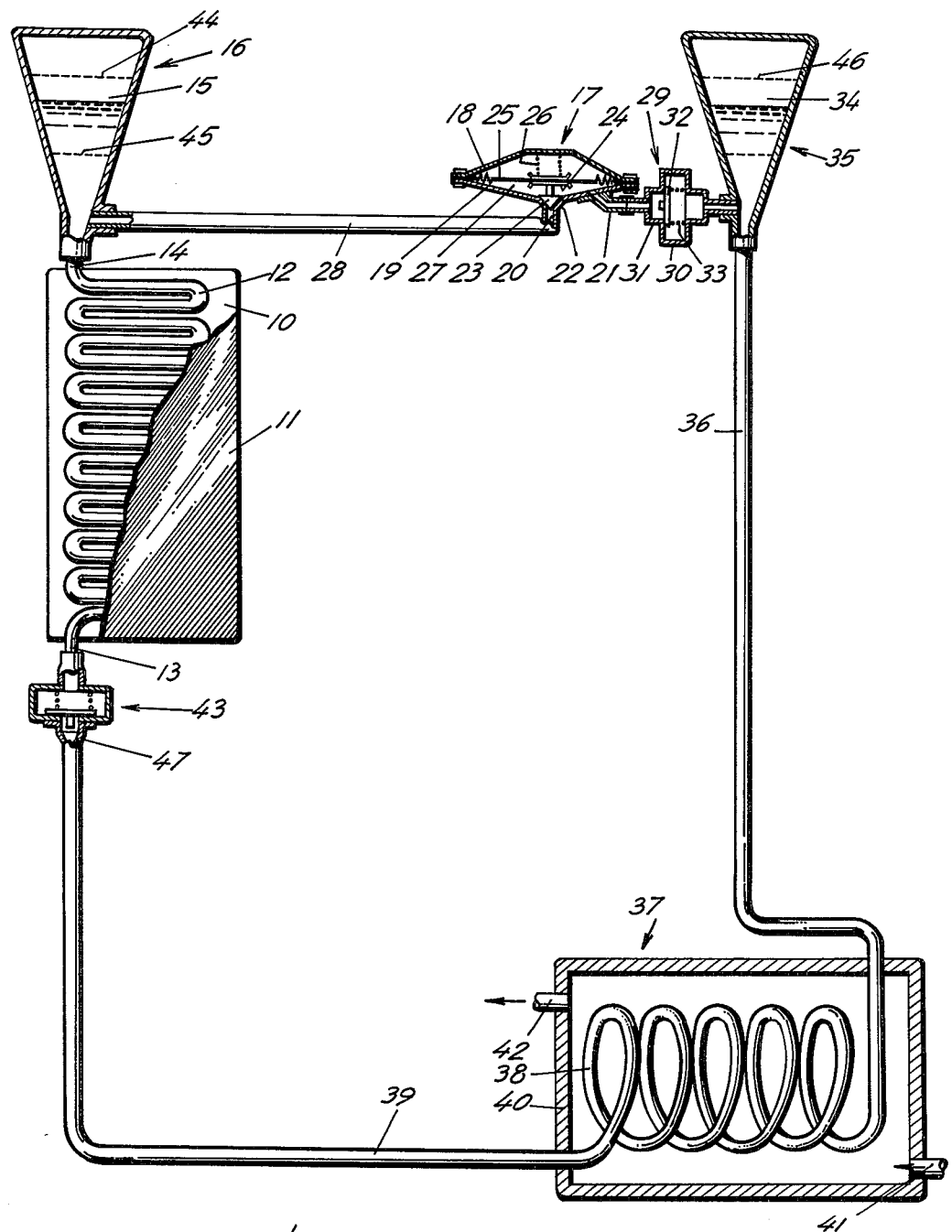

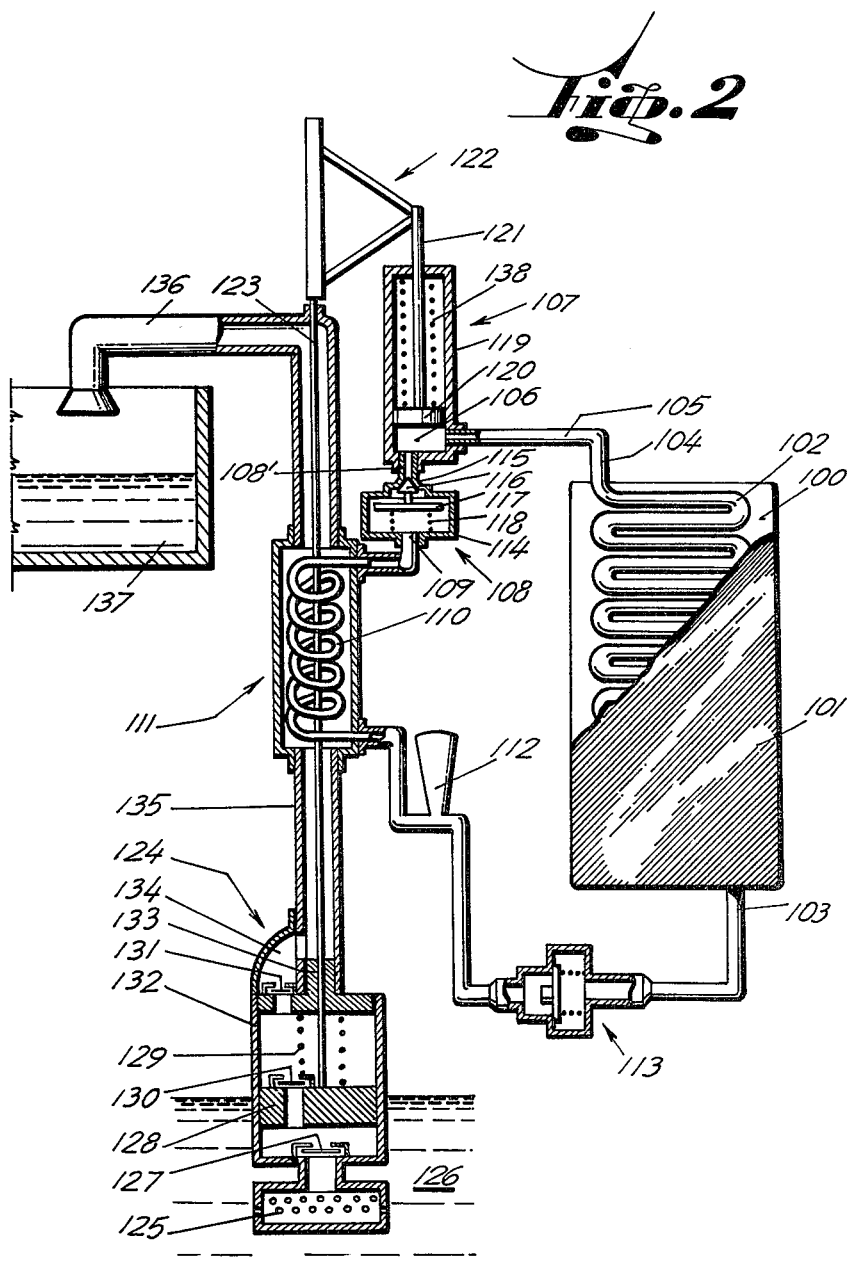

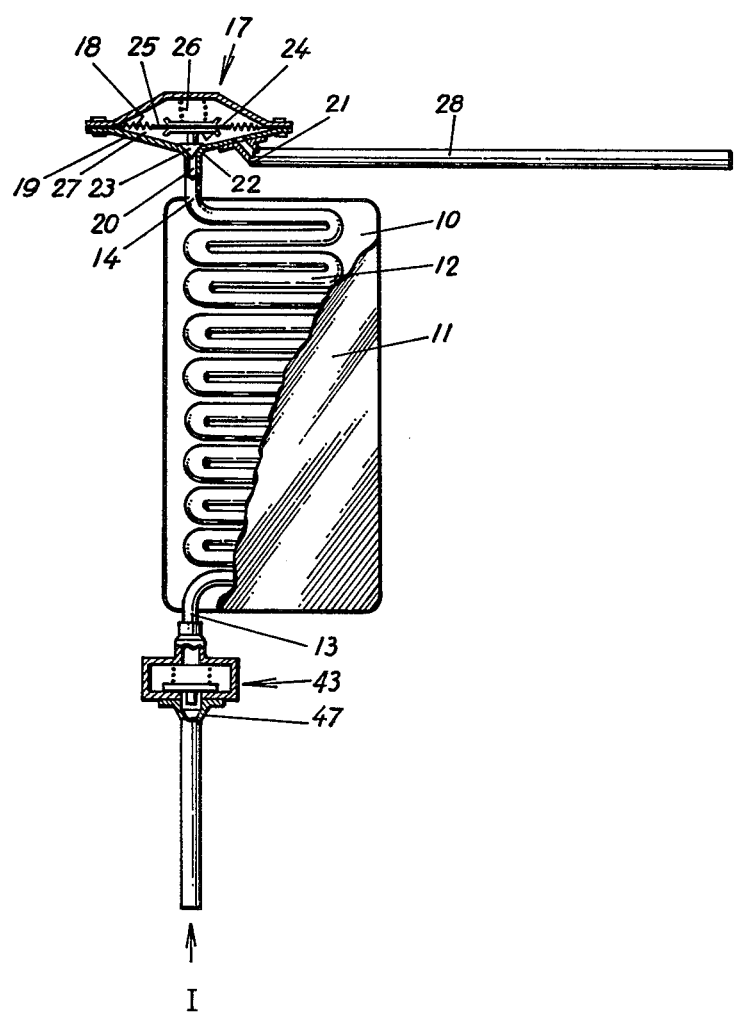

SYSTEMS FOR MAKING USE OF THE ENERGY CARRIED BY A FLUID AND SUPPLIED THERETO BY SOLAR ENERGY

BACKGROUND OF THE INVENTION

1. Field of the Invention

The present invention relates to a system for making use of the energy carried by a fluid and which is supplied thereto by a solar energy detector designed to convert the solar energy into heat.

2. Description of the Prior Art

Systems of the general nature mentioned above are known in the art, particularly for air and water heating in buildings and homes. However they either operate on the principle of a thermo-syphon or else they are provided with pumps to cause movement of the fluid heated by the solar energy impinging on the detector. Those systems operating on the principle of the thermo-syphon are not adequate when the solar energy detector is positioned at a level above that at which the energy in the fluid is extracted therefrom such as when the solar energy detector is connected to a heat exchanger for heating water flowing therethrough and the heat exchanger is at a level below that of the detector. To overcome this drawback pumps are provided to cause the circulation of fluid through the solar energy detector.

It is the aim of the present invention to provide a simple system for making use of the energy carried by a fluid which has been heated in a solar energy detector and which is caused to flow to any place of use only by the energy it has acquired from the detector.

It has been found that the present invention has important advantages in the direct heating of air fed into closed spaces, in the indirect heating of air and water and in the production of work.

Consequently these possible uses of the present invention will be described in detail. However, those who are experts in the art will easily see, from the detailed description of the preferred embodiments, as well as from the broad references to other uses of the present invention, how the teachings of this invention can be advantageously applied to a multiplicity of other systems using the energy contained in a fluid.

SUMMARY OF THE INVENTION

Broadly speaking the invention resides in a system for heating a fluid and causing it to flow, comprising a solar energy receiving panel for converting solar energy into thermal energy; means for conducting a fluid through said panel and to transfer the fluid and unidirectional valve means operated only by the energy in the fluid to enable unidirectional intermittent flow of the fluid through the panel.

More particularly, the invention resides in a system for heating a fluid and causing it to flow, the system being operable by solar energy and comprising a solar energy receiving panel incorporating a solar energy receiving surface for converting solar energy into heat, conduit means formed in said panel for (a) conducting the fluid, (b) for receiving the heat generated at said surface and (c) transmitting the heat received to said fluid; a fluid inlet and a fluid outlet for said conduit means; a first unidirectional valve means at said inlet to permit ingress of fluid to said conduit means and to prevent egress of fluid therefrom and operable to allow said ingress of fluid in response to a relative reduction in the pressure of the fluid in said conduit means and to prevent said egress of fluid in response to a relative increase in pressure of the fluid in said conduit means; a conduit; a second unidirectional valve means; said conduit being arranged to receive fluid from said outlet and conduct it to said second unidirectional valve means, this valve means being adapted to be opened by a relative increase in pressure of the fluid in said conduit and conduit means, by effect of said solar energy, above a predetermined value, and to be held open for a given time, after said increase in pressure of the fluid has decreased to below said value to permit the flow of fluid through said conduit; said fluid flowing through said conduit causing a reduction in pressure in said conduit means whereby said first valve is opened enabling ingress of fluid to said conduit means.

BRIEF DESCRIPTION OF THE DRAWINGS

FIG. 1 is a schematic illustration of one of the preferred embodiments of the system of the present invention.

FIG. 2 is a schematic illustration of another of the preferred embodiments of the system of the present invention.

FIG. 3 is a schematic illustration of still another of the preferred embodiments of the system of the present invention.

DESCRIPTION OF THE PREFERRED EMBODIMENTS

The system shown in FIG. 1 comprises a conventional solar energy receiving panel 10 incorporating a solar energy receiving surface 11 for converting the solar energy received thereby into heat. To this effect this surface is generally opaque and black and is in good thermal transfer relationship with a conduit 12 formed in said panel and which is adapted to conduct a fluid through the panel and transfer to the fluid the heat it receives from the surface 11.

Conduit 12 is provided with an inlet 13 at its "cold" end and an outlet 14 at its "hot" end. Outlet 14 is connected to the lower portion of a closed chamber 15 defined in a pressure accumulator 16. Chamber 15 of pressure accumulator 16 is connected also by its lower portion to a unidirectional differential valve 17 by a conduit 28 whereby there is a communication for the fluid in conduit 12, to chamber 15 and valve 17.

Valve 17 comprises an external housing formed by two halves 18 and 19 secured together by screws extending through flanges integral with each half housing.

An inlet 20 and an outlet 21 are defined in the lower part of the valve. A conical valve seat 22 is formed in the mouth of inlet 20 and is adapted to be closed by a valve plunger 23 secured to a plate member 24 which rests against a diaphragm 25 secured at its edge between the flanges of half housings 18 and 19. A spring 26 is positioned between housing 18 and diaphragm 25 to movably keep valve plunger 23 seated against valve seat 22. Spring 26 will cause valve 22, 23 to open only when a force is exerted on valve plunger 23, from inlet 20, which is greater than the force exerted by spring 26.

However once valve plunger 23 is lifted off its seat 22 it will be kept in an open position by a pressure within chamber 27 which is less than the original pressure within inlet 20 which unseated valve plunger 23, because once valve plunger 23 is unseated the pressure of the fluid in conduit 28 and inlet 20 acts on a greater surface (that of diaphragm 25).

In this way a differential valve 17 is provided in which the valve plunger 23 is opened by a pressure of the fluid in conduit 28, above a predetermined value, and is held open even after the pressure in conduit 28 has fallen below that value, thus permiting the flow of fluid through valve 17 to be maintained for a certain period of time after the pressure in conduit 28 has fallen below said above mentioned value. Valve plunger 23 will again rest against valve seat 22 once the pressure in the fluid in chamber 27 and which acts on diaphragm 25 is of a value which is insufficient to keep spring 26 compressed.

This same delay in the closing action of valve 17 can be achieved by other types of known valves such as a differential disc valve (shown in FIG. 2 with reference 107) or a magnetic valve.

Outlet 21 is connected to the inlet of an automatic unidirectional valve 29 comprising a casing 30, a valve seat portion 31 and a disc 32 adapted to rest against valve seat portion 31 to block the passage of fluid therethrough. Disc 32 is urged to rest against valve seat 31 by a spring 33.

The outlet of unidirectional valve 29 is connected to the lower portion of another closed chamber 34 defined in a pressure accumulator 35. Chamber 34 of pressure accumulator 35 is connected, also by its lower portion, through a conduit 36 to one end of an arrangement 37 for extracting heat from the fluid. This heat extracting arrangement 37, in this embodiment, is a heat exchanger having a spiral shaped conduit 38 whose inlet is connected to conduit 36 and having an outlet connected to another conduit 39. Conduit 38 is positioned within a tank 40 having an inlet 41 and an outlet 42 for example for water and whereby cold water entering through inlet 41 comes into contact with conduit 38, becomes heated, and leaves tank 40 through outlet 42.

Inlet 41 can be connected to a cold water supply line while outlet 42 can be connected to the hot water distribution system of a building.

Conduit 39 is connected to the inlet of an automatic unidirectional valve 43 having a structure similar to that of unidirectional valve 29. The outlet of valve 43 is connected to inlet 13 of conduit 12, thus closing the circuit of the system.

The fluid, to which reference has been made, has preferably a high coefficient of expansion. From this point of view, a gas is preferable, although liquids, with a higher specific heat are preferable from another point of view because of the amount of heat they can "carry", although their expansion is much less than that of a gas.

In the embodiment described, it is possible to use water as the fluid within the system although air affords excellent results for certain uses.

The operation of the system shown in FIG. 1 will now be described, on the assumption that it contains water.

Upon panel 10 receiving solar energy, the water contained in conduit 12 will become heated and expand. Due to this expansion, part of the volume of water within conduit 12 will move into chamber 15 and cause the normal level of water there in, to reach level 44 inasmuch as the water cannot flow out of inlet 13 due to the presence of valve 43 nor out of conduit 28 into chamber 27 because valve plunger 23 is seated against valve seat 22. When the pressure in chamber 15 reaches a value which is sufficient to overcome the force of spring 26, valve plunger 23 will become unseated and the pressure of the water within conduit 28, and now within chamber 27, will act on diaphragm 25, thus preventing valve 17 from closing. While valve 17 is open, the water accumulated in chamber 15 will flow out of this chamber into chamber 34 through conduit 28 with a certain inertia (mass by speed) which is a function of the pressure attained within chamber 15. Even when this pressure becomes zero, the fluid piston flowing along conduit 28, with the above noted inertia, will continue to flow due to the latter, causing the water within chamber 15 to descend to level 45 and causing an under-pressure within chamber 15. This under-pressure within chamber 15 is transmitted to conduit 12. Due to the under-pressure within conduit 12, with respect to the now increased pressure in chamber 34 and conduits 36, 38 and 39, valve 43 will be opened and fresh water will enter into conduit 12 through inlet 13. The water entering conduit 12 through inlet 13 is colder than that contained therein because heat has been extracted therefrom in arrangement 37.

When the under-pressure within chamber 15 reaches a value which is sufficient to detain the flow of water along conduit 28, valves 17 and 29 will become closed. Valve 17 becomes closed slightly before valve 29 because of the closing forces (springs 26 and 33) acting thereon.

Chamber 34 is dimensioned so that when the water flowing thereinto reaches level 46, the pressure therein is lower than the pressure of spring 26 on diaphragm 25, thus avoiding the back flow of water from chamber 34 to chamber 15. However for safety, valve 29 is interposed between valve 17 and pressure accumulator 35 thus avoiding any possibility of back flow of water.

Accumulator 35 serves to accumulate any expansion or contraction of the water caused by the temperatures thereof. This is particularly important so as to avoid an excessive pressure within 38 which could cause damage thereto.

The volume of chamber 34 is much larger than the volume of chamber 15 and while an under-pressure is present in chamber 15, water is accumulated within accumulator 35 until this pressure difference between chamber 15 and chamber 34 is sufficient to open valve 43 enabling water to enter conduit 12. Obviously, once cold water has entered into conduit 12 the pressure difference between conduit 12 and chamber 34 is reduced and valve 43 is closed, by effect of its spring, for initiation of a new cycle.

Consequently, valve 43 is operable to allow ingress of water to conduit 12 in response to a reduction of pressure in conduit 12 with respect to the pressure in 39 and prevents egress of water from conduit 12 in response to an increase of pressure in conduit 12 with respect to the pressure in conduit 39.

If desired, conduit 28 can be adapted to be connected to a turbine and the system can be filled with mercury in place of water. In this event the flow of the mercury through the turbine will cause its rotation which can be used to drive a mechanism for producing usefull work.

Additionally, and as will be explained in more detail in connection with FIG. 2, one or both of chambers 15 and 34 which have a fixed volume can be replaced by variable volume chambers such as cylinder and piston arrangements or chambers defined in part by respective diaphragms whereby relative movement of the cylinder and piston or of the diaphragm can be used to produce useful work in addition to the thermal energy extracted from the fluid in arrangement 37.

However, before describing FIG. 2 in detail, it is of importance to note that a simplified version of the arrangement shown in FIG. 1 can be used to pump heated atmospheric air into a space to be heated.

To this effect the fluid which will flow through conduit 12 will be atmospheric air.

As panel 10 is normally positioned upon the roof of the room or house to be heated it is preferred, so as to reduce costs, to provide a system operating as an open circuit and not as a closed circuit as shown in FIG. 1.

The open circuit air heating system to which reference is now made, and which is shown in FIG. 3, will have an inlet I connected to atmosphere and applied directly to the inlet 47 of valve 43. Panel 10 will also form part of the system although conduit 12 should preferably be of larger volume whereby it is possible to avoid incorporating a pressure accumulating chamber, such as chamber 15, in the system. Consequently outlet 14 will be connected through a conduit to valve 17. Outlet 21 of valve 17 is connected to conduit 28 which has an outlet for directly pumping heated air into the space to be heated.

The operation of this system will be as follows:

The air present within conduit 12 will expand due to the heat it receives from the solar energy received, causing an increase in pressure therein until such pressure is sufficient to open valve 17. Once valve plunger 23 becomes unseated, air will flow out of outlet 21. The pressure of the air in chamber 27 will be sufficient, for a certain time, to maintain valve plunger 23 unseated.

The effect of the flow of air from conduit 12 through valve 17 will cause a relative decrease in pressure within conduit 12, with respect to atmospheric pressure, whereby valve 43 will be opened and fresh air will be taken from atmosphere through inlet 47. By this time valve 17 will have become closed because the effect of the air in chamber 27, and acting on diaphragm 25, is insufficient to maintain valve plunger 23 unseated.

The fresh air now received by conduit 12 will be heated and a new cycle will commence.

It will be seen from the foregoing that by means of a simple arrangement incorporating valve 43, panel 10 and valve 17 it is possible to provide an air heating arrangement for rooms and buildings.

In this simple embodiment as well as in the full embodiment shown in FIG. 1, differential valve 17 can be replaced by a valve which will open once the pressure acting thereon reaches a predetermined value but which will remain open, for a given time, due to any delay mechanism, after said pressure has decreased below said predetermined value and as long as it has not reached a predetermined minimum.

Reference will now be made to the embodiment of FIG. 2 which shows another system for making use of the energy received by a fluid and which is supplied thereto by a solar energy detector.

This embodiment also comprises a conventional solar energy receiving panel 100 incorporating a solar energy receiving surface 101 for converting the solar energy received thereby into heat.

This surface 101 is in good thermal transfer relationship with a conduit 102 formed in said panel and which is adapted to conduct the fluid through the panel 100 and transfer to the fluid the heat received from surface 101.

Conduit 102 is provided with an inlet 103 at its "cold" end and an outlet 104 at its "hot" end. Outlet 104 is connected by a conduit 105 to the lower portion of a closed chamber 106 defined in a pressure accumulator 107.

Chamber 106 of pressure accumulator 107 is connected, also by its lower portion, to a unidirectional differential valve 108 by a conduit 108'.

Valve 108 is responsive to pressure differences acting thereon and has an outlet 109 in communication with one end of a spiral 110 of a heat exchanger 111. The other end of spiral 110 is in communication with the lower part of a second pressure accumulator chamber 112. The lower part of this chamber 112 is also connected to inlet 103 through an automatic unidirectional valve 113 of the same type as that shown in FIG. 1 and identified by references 29 and 43.

Valve 108 comprises an external housing 114; a valve seat 115 is defined at the inlet end of valve 108 and is adapted to be closed by a valve plunger 116 secured to a plate member 117. A spring 118 is positioned between housing 114 and plate member 117 to keep valve plunger 116 seated against valve seat 115. Spring 118 will cause valve 108 to open only when a force is exerted on valve plunger 116, from chamber 106, which is greater than the force exerted by spring 118.

However, once valve plunger 116 is unseated, it will be kept in an open position by the flow of fluid through valve 108 inasmuch as the effect of the fluid flow will act on the entire surface of plate member 117 which faces the inlet of valve 108.

In this way a "differential" valve 108 is provided in which the valve plunger 116 is opened by a pressure in closed chamber 106, above a predetermined value, and is held open even after the pressure in closed chamber 106 has fallen below that value, thus permitting the flow of fluid through valve 108 to be maintained for a certain period of time after the pressure in closed chamber 106 has fallen below said above mentioned value. Valve plunger 116 will return to rest against valve seat 116 once the effect of the flowing fluid is insufficient to keep spring 118 compressed. This same delay in the closing action of valve 108 can be achieved by other types of known valves such as the diaphragm valve shown in FIG. 1 with reference 17, or with a magnetic valve.

Pressure accumulator 107 comprises a cylinder 119 and a piston 120. Piston 120 is connected through a rod 121 to a rigid structure 122 integral with a shaft 123 of a water pump 124.

Water pump 124 includes an inlet 125 arranged to receive water from for example an underground water supply 126.

Water pump 124 is a conventional arrangement which will not be described in detail. As is known in the art this type of arrangement comprises a one-way valve 127, a piston 128, a spring 129, a further two one-way valves 130–131, a housing 132, a guide 133 for shaft 123, a conduit 134 communicating the interior of housing 132 with a vertical pipe 135 movably housing shaft 123. Those skilled in the art will see that the alternate movement of piston 128 causes water to flow from water supply 126 through conduit 134, along pipe 135, through heat exchanger 111, and lastly through pipe 136 into tank 137. The alternate movement of piston 128 is obtained as follows:

The closed circuit defined by conduit 102, conduit 105, chamber 106, spiral 110 and valve 113 is full of a fluid which will become expanded in conduit 102, when solar energy is received by surface 101 inasmuch as this solar energy is converted into heat and transferred to that fluid. Due to this expansion, part of the fluid contained in conduit 102 will occupy chamber 106 causing piston 120 to move upwards against the resistance of spring 138. The fluid originally contained in conduit 105 and chamber 106 will also expand due to heat transfer, thus further increasing the volume of chamber 106. The upward movement of piston 120 is transmitted to piston 128.

Once piston 120 reaches its upper dead position and the fluid in chamber 106 reaches a pressure which is sufficient to unseat valve plunger 116, the fluid in the system will flow through spiral 110 with a certain inertia which will maintain valve 108 open although the pressure in chamber 106 decreases to a value below that which caused valve plunger 116 to become unseated. This fluid will accumulate in pressure accumulator 112. Due to the effect of spring 138, piston 120 will be caused to move downwards until it reaches its lower dead position. The downward movement of piston 120 is transmitted to piston 128. After piston 120 has reached its lower dead position, valve plunger 116 will remain unseated for a short time due to the inertia of the fluid flowing through valve 108. This will cause a relative decrease in pressure or under-pressure within conduit 102, which added to the over-pressure in pressure accumulator 112, will cause valve 113 to become opened, permitting ingress of now cold fluid into conduit 102 through inlet 103. It is to be noted that the fluid entering chamber 112 is colder than the fluid entering spiral 110 because of the cooling effect of the water from deposit 126 and which flows upwards through exchanger 111.

The fresh fluid now in conduit 102 will again become heated by solar energy thus initiating a new cycle.

If desired, water pump 124 can be replaced by the compressor of a refrigerating unit whereby the system of the present invention can be used in a refrigerating system.

As all the embodiments described cause the discontinuous flow of fluid through the system, if necessary it is contemplated to combine various systems of the present invention so that they operate in synchronism thus obtaining a substantially pulse free operation of the means using the energy supplied thereto by the fluid heated by solar energy.

I claim:

1. An apparatus operable by solar energy for heating a fluid and causing it to flow, said apparatus comprising:

a solar energy receiving panel having a solar energy receiving surface for converting solar energy into heat;

conduit means having a fluid inlet and a fluid outlet operatively associated with said panel for conducting the fluid and for transferring heat generated at said surface to said fluid;

first valve means attached to said fluid inlet and being adapted to connect said fluid inlet to a source of fluid, said first valve means allowing unidirectional fluid ingress into said conduit means and being movable from a closed to an open position when the pressure within said conduit means is reduced to a level lower than the pressure level of the source of fluid;

second valve means attached to said fluid outlet, said second valve means allowing unidirectional fluid egress from said conduit means and being adapted to connect said fluid outlet to a receiving space for receiving fluid egressing from said conduit means, said second valve means being movable from a closed position to an open position when the pressure caused by the expansion of said fluid within said conduit means exceeds a predetermined level, said second valve means remaining in said open position while the pressure within said conduit means falls below said predetermined level, said second valve means being adapted to be moved from said open position to said closed position after the pressure within said conduit means falls below the pressure within the source of fluid, said second valve means being prevented from moving from said open to said closed position by the combined pressure and inertial force of fluid flowing along said conduit means and through said second valve means.

2. An apparatus as claimed in claim 1 wherein the source of fluid is the atmosphere.

3. An apparatus operable by solar energy for heating a fluid and causing it to flow, said apparatus comprising:

a solar energy receiving panel having a solar energy receiving surface for converting solar energy into heat;

first conduit means having a fluid inlet and a fluid outlet operatively associated with said panel for conducting the fluid and for transferring heat generated at said surface to said fluid;

second conduit means having an outlet for supplying fluid to said fluid inlet of said first conduit means and having an inlet for receiving fluid from said fluid outlet of said first conduit means;

first valve means connected between said fluid inlet of said first conduit means and said outlet of said second conduit means, said first valve means being adapted to allow unidirectional fluid ingress into said first conduit means and being movable from a closed to an open position when the pressure within said first conduit means is reduced to a level lower than the pressure level of the fluid in said second conduit means;

second valve means connected between said inlet of said second conduit means and said fluid outlet of said first conduit means, said second valve means being adapted to allow unidirectional egress of fluid from said first conduit means and being movable from a closed position to an open position when the pressure caused by the expansion of said fluid within said first conduit means exceeds a first predetermined level, said second valve means being adapted to remain in said open position while the pressure within said first conduit means falls below said first predetermined level and being adapted to be moved from said open position to said closed position after the pressure within said first conduit means falls below a second predetermined level, said second valve means being prevented from moving from said open position to said closed position by the combined pressure and inertial force of the fluid flowing along said first conduit means and through said second valve means; and heat rejection means associated with said second conduit means for rejecting heat from said fluid.

4. An apparatus operable by solar energy for heating a fluid and causing it to flow, said apparatus comprising:

a solar energy receiving panel having a solar energy receiving surface for converting solar energy into heat;

conduit means having a fluid inlet and a fluid outlet operatively associated with said panel for conducting the fluid and for transferring heat generated at said surface to said fluid;

a first space for receiving fluid from said conduit means;

a second space for holding fluid to be supplied to said conduit means;

first valve means connected between said fluid inlet of said conduit means and said second space, said first valve means being adapted to allow unidirectional fluid ingress into said conduit means and being movable from a closed to an open position when the pressure within said conduit means is reduced to a level lower than the pressure within said second space;

second valve means connected between said fluid outlet of said conduit means and said first space, said second valve means being adapted to allow unidirectional egress of fluid from said conduit means and being movable from a closed position to an open position when the pressure caused by the expansion of said fluid within said conduit means exceeds a first predetermined level, said second valve means being adapted to remain in said open position while the pressure within said conduit means falls below said first predetermined level and being adapted to be moved from said open position to said closed position after the pressure within said conduit means falls below a second predetermined level, said second valve means being prevented from moving to said closed position from said open position by the combined pressure and inertial force of the fluid flowing along said conduit means and through said second valve means; and heat rejection means associated with said first space for rejecting heat from said fluid.

5. An apparatus as claimed in claim 4 wherein said first space is connected to said second space and said first space and said second space are separated from the atmosphere.

6. An apparatus as claimed in claim 5, wherein said conduit means includes a first pressure accumulating chamber positioned between said fluid inlet and said fluid outlet to accumulate fluid pressure within said conduit means while both said valve means are closed.

7. An apparatus as claimed in claim 6, further comprising said heat rejection means being connected to receive fluid from said first space and to feed fluid to said second space, and a second pressure accumulating chamber connected to accumulate pressure generated in the heat rejection means to avoid damage thereto.

8. An apparatus as claimed in claim 7, wherein said second valve means is a pressure differential valve comprising first means responsive to fluid pressure for opening the valve once the fluid pressure acting thereon reaches a first predetermined value and second means responsive to fluid pressure acting thereon for maintaining said valve open in response to fluid pressure of a value below said first predetermined value.

9. An apparatus as claimed in claim 5, wherein said second valve means is of the fast open slow close type.

10. An apparatus as claimed in claim 4, wherein said second space is connected to atmosphere and said fluid outlet is adapted to pump heated atmospheric air into a space to be heated.

11. An apparatus as claimed in claim 7, wherein said heat rejection means is a heat exchanger.

12. An apparatus as claimed in claim 6, wherein said first pressure accumulating chamber is the cylinder of a cylinder and piston arrangement; the apparatus further comprising means for using the work produced by said cylinder and piston arrangement.

13. An apparatus as claimed in claim 12, wherein said means for using the work produced by said cylinder and piston arrangement is a water pump.

* * * * *